(12) United States Patent
Handa

(10) Patent No.: US 6,786,293 B2
(45) Date of Patent: Sep. 7, 2004

(54) TWO-WHEEL-DRIVE/FOUR-WHEEL-DRIVE SWITCHING SYSTEM FOR VEHICLE

(75) Inventor: Akio Handa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/322,739

(22) Filed: Dec. 19, 2002

(65) Prior Publication Data

US 2003/0213634 A1 Nov. 20, 2003

(30) Foreign Application Priority Data

Dec. 26, 2001 (JP) ........................................ 2001-394336

(51) Int. Cl.[7] ............................................. B60K 17/354
(52) U.S. Cl. ........................ 180/247; 180/248; 180/249; 196/84.96
(58) Field of Search ................................ 180/247, 248, 180/249, 233; 196/84.96; 701/69

(56) References Cited

U.S. PATENT DOCUMENTS

| | | | | |
|---|---|---|---|---|
| 3,744,609 A | * | 7/1973 | Miller | ..................... 192/111 A |
| 4,030,581 A | * | 6/1977 | Giometti | ..................... 192/16 |
| 6,530,447 B2 | * | 3/2003 | Seki et al. | ................... 180/233 |
| 6,679,348 B2 | * | 1/2004 | Handa et al. | ............... 180/247 |
| 6,698,563 B2 | * | 3/2004 | Handa et al. | ................. 192/35 |

* cited by examiner

Primary Examiner—Lesley D. Morris
Assistant Examiner—Tony Winner
(74) Attorney, Agent, or Firm—Birch, Stewart, Kolasch & Birch, LLP

(57) ABSTRACT

A two-wheel-drive/four-wheel-drive switching system for a vehicle wherein a switching mechanism is securely fixed and functions of the switching mechanism can be secured, preventing noise from being made. An outside flange is provided to an electromagnetic coil forming a switching mechanism for switching two wheel drive and four wheel drive. A fitting section having a difference in a level to which the outside flange touches is formed in a casing in which the switching mechanism is installed. A fitting groove is formed on the inside face at an interval equal to or larger than the thickness of the outside flange from the fitting section. A circlip opposite to the outside flange is inserted into the circular groove and the outside flange is pressed on the fitting section by inserting a circular elastic member between the circlip and the outside flange.

14 Claims, 9 Drawing Sheets

FREE STATE

LOCKED STATE

NORMAL RUNNING

2WD MODE: CLUTCH FREE    4WD MODE: CLUTCH LOCKED

REAR BRAKE APPLIED

2WD MODE: CLUTCH LOCKED    4WD MODE: CLUTCH LOCKED

TWO-WHEEL-DRIVE/FOUR-WHEEL-DRIVE SWITCHING SYSTEM FOR VEHICLE

CROSS-REFERENCE TO RELATED APPLICATIONS

BACKGROUND OF THE INVENTION

1. Field of the Invention

The present invention relates to a two-wheel-drive/four-wheel-drive switching system for a vehicle.

2. Description of Background Art

Heretofore, a vehicle which can switch two wheel drive and four wheel drive is known.

FIGS. 7 to 9 show an example of the vehicle 1 that includes a body frame 3 with an engine 2 mounted in the center thereof. Front wheels 4 and rear wheels 5 are provided together with a steering handlebar 6 arranged in the front upper part of the body frame 3 for steering the front wheels 4. A fuel tank 7 is attached to the body frame 3 and a seat 8 is attached to the rear of the fuel tank 7.

Each front wheel 4 and each rear wheel 5 are supported by suspensions 9 and 10 provided to the body frame 3 as shown in FIG. 8 so that they can be vertically moved.

A final reduction gear unit 13 for the front wheels 4 and a final reduction gear unit 14 for the rear wheels 5, respectively, are coupled to the engine 2 via propeller shafts 11 and 12 provided to the body frame 3. The right and left front wheels 4 and the right and left rear wheels 5 are connected to the final reduction gear unit 13 for the front wheels 4 and the final reduction gear unit 14 for the rear wheels 5.

A two-wheel-drive/four-wheel drive switching system 15 for switching a state of rear wheel drive and a state of four wheel drive by connecting or disconnecting power transmitted to the front wheels 4 is provided between the final reduction gear unit for the front wheel 13 and the propeller shaft 11, for example.

Or the two-wheel-drive/four-wheel-drive switching system may be also provided between the rear propeller shaft 12 and the final reduction gear unit 14 for the rear wheels 5.

It is proposed to provide the structure shown in FIG. 9 for the two-wheel-drive/four-wheel-drive switching system.

The two-wheel-drive/four-wheel-drive switching system 15 illustrated in FIG. 9 is composed of a switching unit 17 for connecting or disconnecting a pinion shaft 16 of the final reduction gear unit for the front wheel 13 and the propeller shaft 11.

The switching unit 17 is installed in a casing 18 attached to the final reduction gear unit for the front wheel 13 and is provided with an inner ring 19 fitted to the pinion shaft 16 via a spline. An outer ring 21 surrounds the inner ring 19 and is supported by the casing 18 so that the outer ring can revolve. Plural connecting/disconnecting members 22 are inserted between the outer ring 21 and the inner ring 19 for connecting or disconnecting the outer ring 21 and the inner ring 19. A retainer 23 is provided for holding the connecting/disconnecting members 22 so that they can be inclined. An armature 24 is interlocked with the retainer 23 and a switching mechanism 25 is provided for inhibiting the movement of the retainer 23 by attracting the armature 24 to a rotor 26 coupled to the outer ring 21 by the magnetic force and connecting the outer ring 21 and the inner ring 19 via the connecting/disconnecting members 22 by inclining the connecting/disconnecting member 22.

The switching mechanism 25 is made of an electromagnet and is provided with an electromagnetic coil 27 provided inside the rotor 26 and is attached to the casing 18 via an outside flange 28 formed at one end of the electromagnetic coil 27.

The switching mechanism 25 is positioned by touching the outside flange 28 to a fitting section having a difference in a level 18a formed in the casing 18. The switching mechanism 27 is fixed to the casing 18 by fitting a circlip 29 inserted into a fitting groove 18b formed in a position apart from the fitting section 18a by a predetermined distance to the inside face of the casing 18.

The two-wheel-drive/four-wheel-drive switching system 15 configured as described above inhibits the revolution of the armature 24 and the retainer 23 by attracting the armature 24 by the magnetic force of the switching mechanism 25, constrains the movement of each connecting/disconnecting member 22, connects the inner ring 19 and the outer ring 21 via the plural connecting/disconnecting members 22 and hereby, turns a state of two wheel drive into a state of four wheel drive.

The revolution of the armature 24 is freed by disconnecting energizing to the switching mechanism 25, the transmission of power to the final reduction gear unit for the front wheel 13 is disconnected by returning the plural connecting/disconnecting members 22 to a neutral position by a return spring not shown and a state of four wheel drive is turned into a state of two wheel drive by only the rear wheels.

Such a conventional type two-wheel-drive/four-wheel-drive switching system 15 has the following problem to be improved.

The switching mechanism 25 is fixed to the casing 18 by holding the outside flange 28 between the fitting section 18a formed in the casing 18 and the circlip 29 fitted into the fitting groove 18b formed in the casing 18. However, a clearance may be made between the outside flange 28 and the circlip 29. The fitting section 18a depends upon the manufacturing quality of the thickness of the outside flange 28, that of the fitting groove 18b and further, that of the circlip 29.

As a result, it is considered that the switching mechanism 25 is moved in the axial direction of the casing 18 and an interval between the rotor 26 and the armature 24 may be varied.

SUMMARY AND OBJECTS OF THE INVENTION

The invention is made in view of the problem of such a conventional type. The object is to provide a two-wheel-drive/four-wheel-drive switching system for a vehicle wherein a switching mechanism 25 forming the two-wheel-drive/four-wheel-drive switching system is securely fixed and a function of the switching mechanism can be secured, preventing noise from being made.

A two-wheel-drive/four-wheel-drive switching system for a vehicle according to the present invention includes a switching unit provided to either of the power transmission mechanisms provided between an engine and a front wheel and between the engine and a rear wheel for connecting or disconnecting the transmission of power in the power transmission mechanism. A driving shaft couples to the drive side with a driven shaft fitted to the driving shaft via circular clearance. Plural connecting/disconnecting members are inserted into clearance between the driving shaft and the driven shaft for connecting or disconnecting the driving shaft and the driven shaft by fitting or drawing them to/apart from the opposite faces of the driving shaft and the driven shaft. A switching mechanism is provided for selectively locating the connecting/disconnecting members in a position where the driving shaft and the driven shaft are connected or in a position where they are disconnected. A casing is provided for housing the switching unit so as to achieve the object. The two-wheel-drive/four-wheel-drive switching system for the vehicle according to the present invention also includes an outside flange that is provided to an electromagnetic coil forming the switching mechanism. A fitting section having a difference in a level to which the outside flange is touched is formed with a fitting groove formed on the inside face at an interval equal to or larger than the thickness of the outside flange from the fitting section. A circlip is provided opposite to the outside flange and is inserted into the fitting groove. The outside flange is pressed on the fitting section by inserting a circular elastic member between the circlip and the outside flange.

A two-wheel-drive/four-wheel-drive switching system for the vehicle according to the present invention provides an elastic member that is formed by a wave washer.

A two-wheel-drive/four-wheel-drive switching system for the vehicle according to present invention provides an elastic member formed by a coned disc spring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to FIGS. 1 to 6, one embodiment of the invention will be described below.

Figure 7:
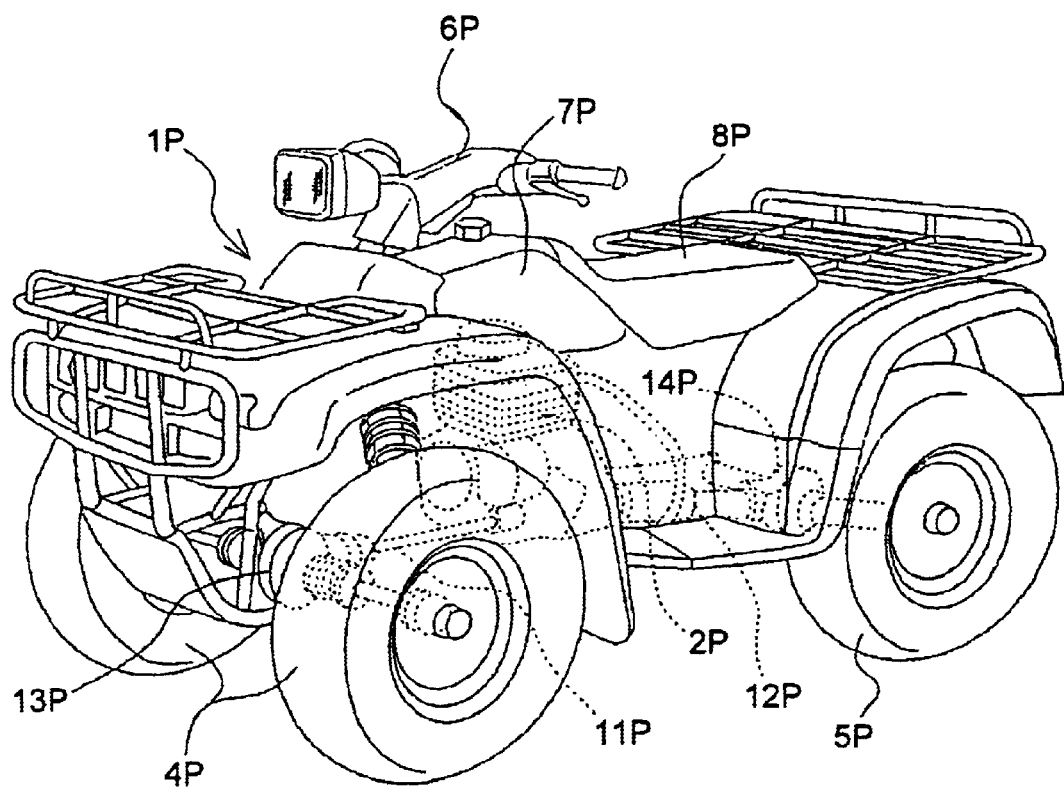
FIG. 7 is a perspective view showing an example of a vehicle provided with a two-wheel-drive/four-wheel-drive switching system.
Figure 8:
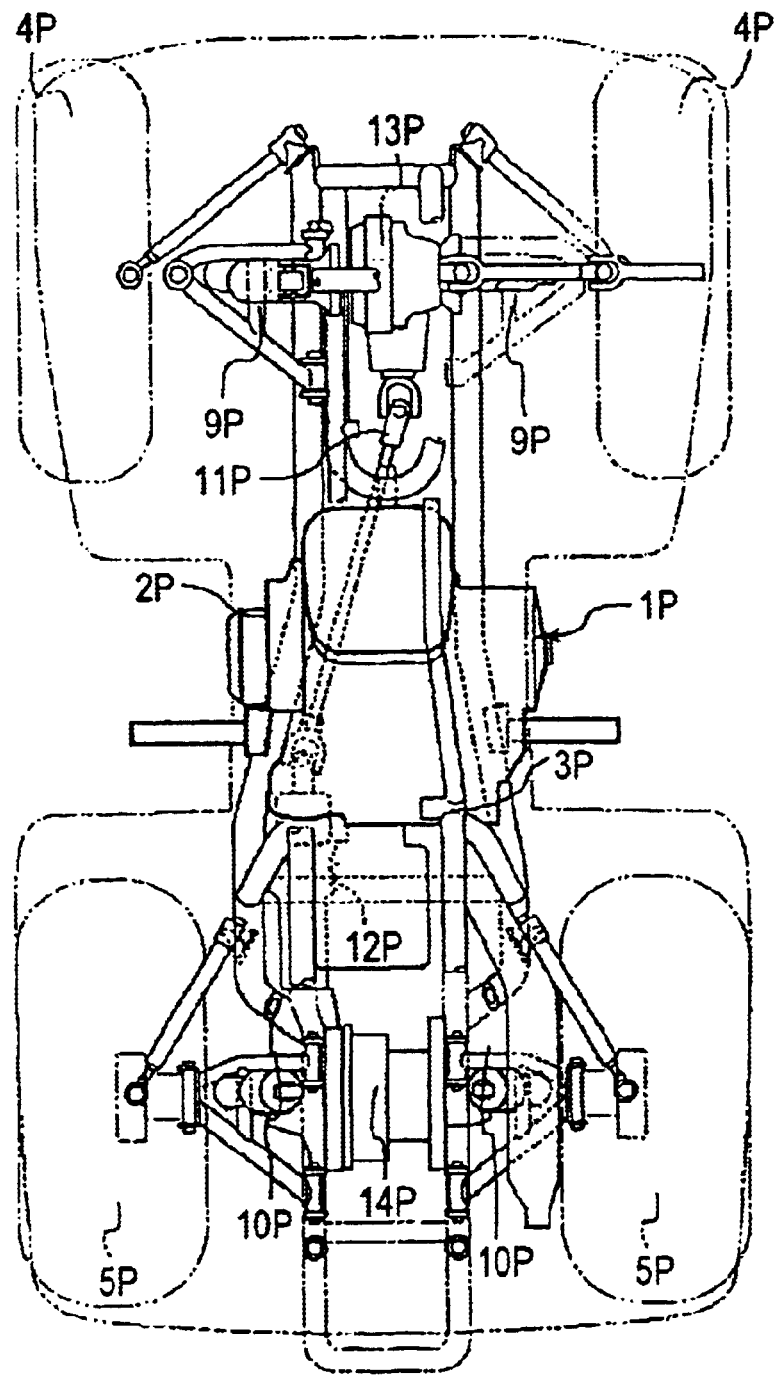
FIG. 8 is a plan view for explaining the configuration of the body of the vehicle shown in FIG. 7.
Figure 9:
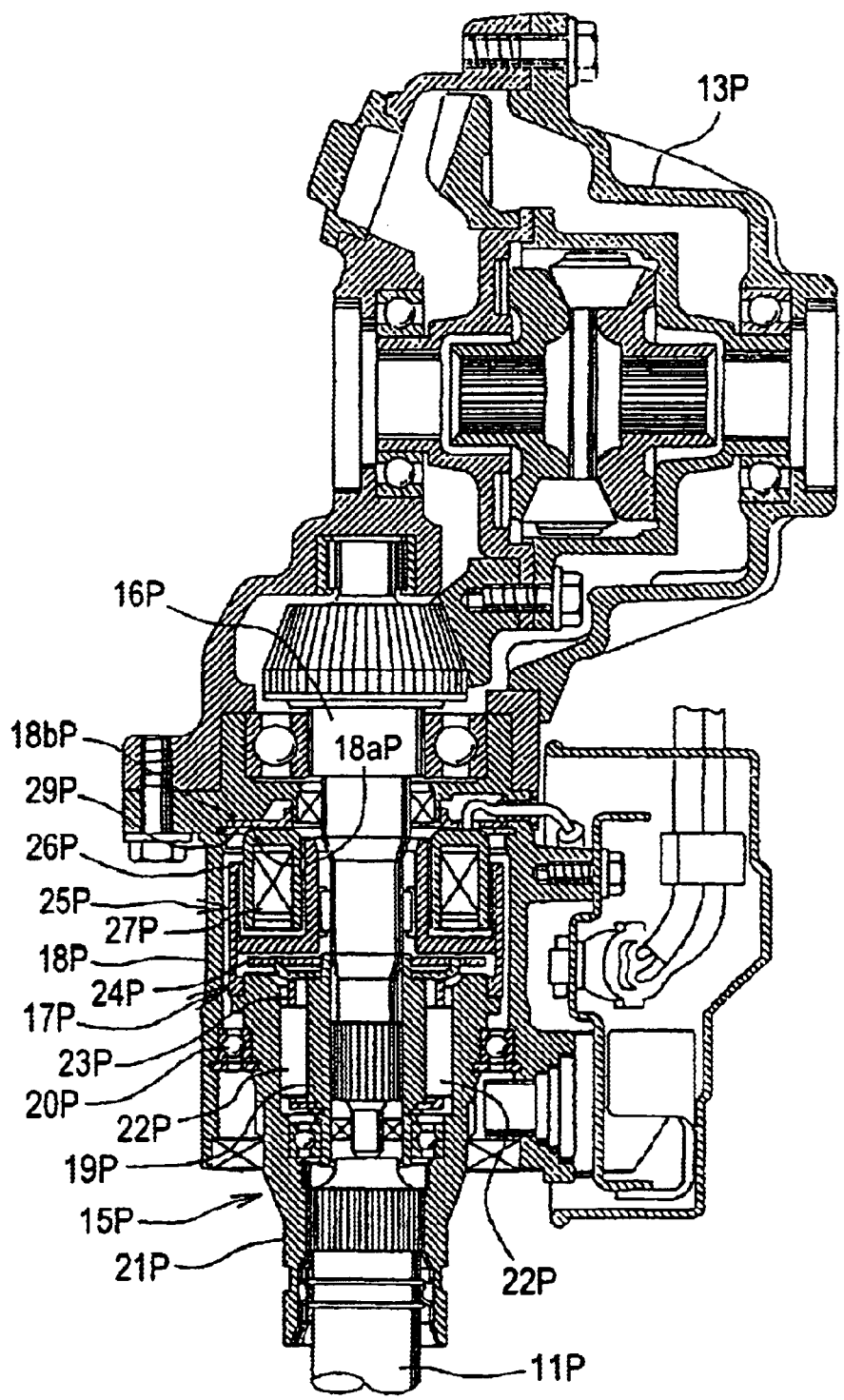
FIG. 9 is a sectional view of the main part showing an example of the structure of the conventional type two-wheel-drive/four-wheel-drive switching system.

In the following description, primary components of the vehicle that are common in FIGS. 7 and 9, are referred to by the same reference numbers to simplify the description.

Figure 1:
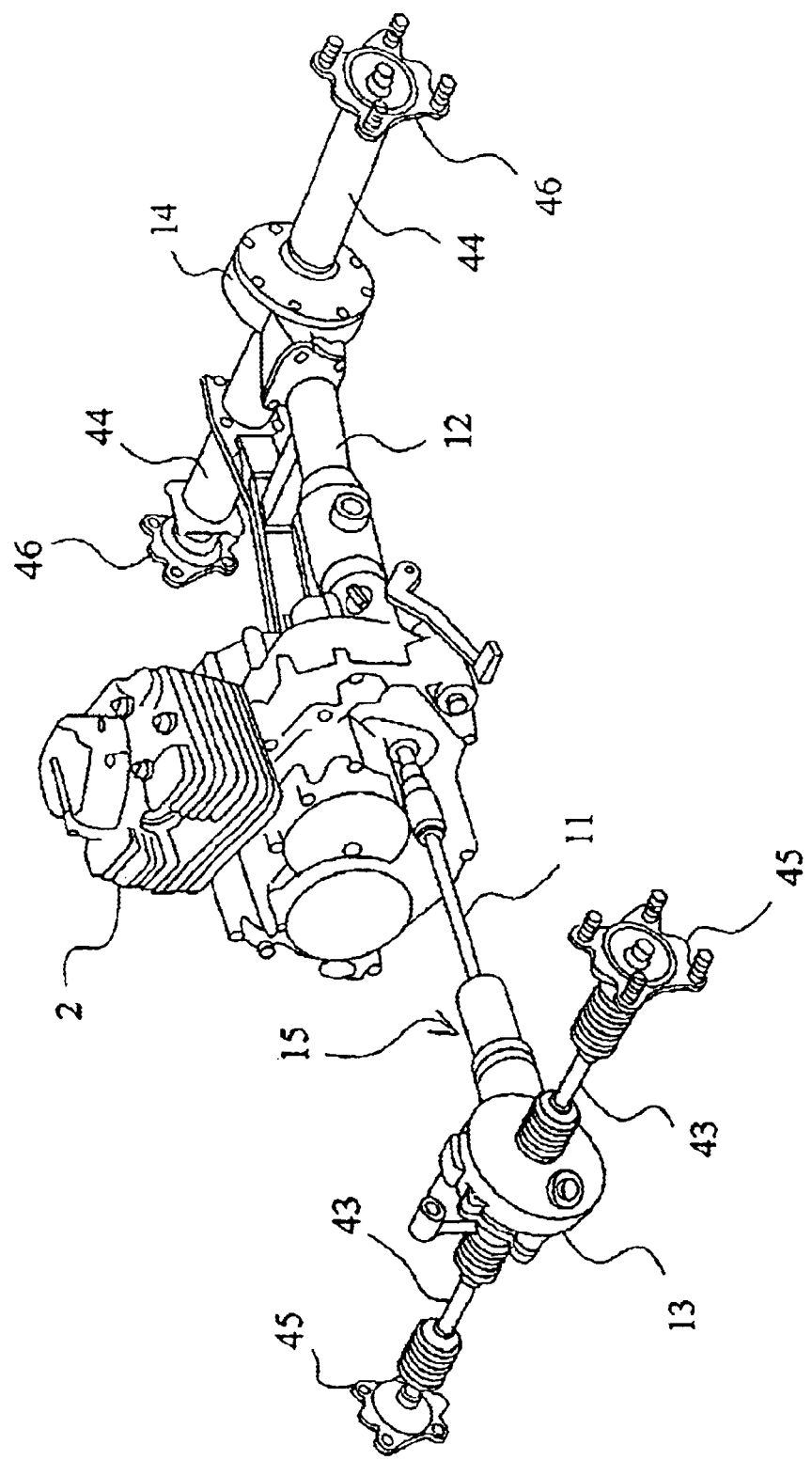
FIG. 1 is a schematic perspective view showing a power transmission system of a vehicle to which one embodiment of the invention is applied.
Figure 2:
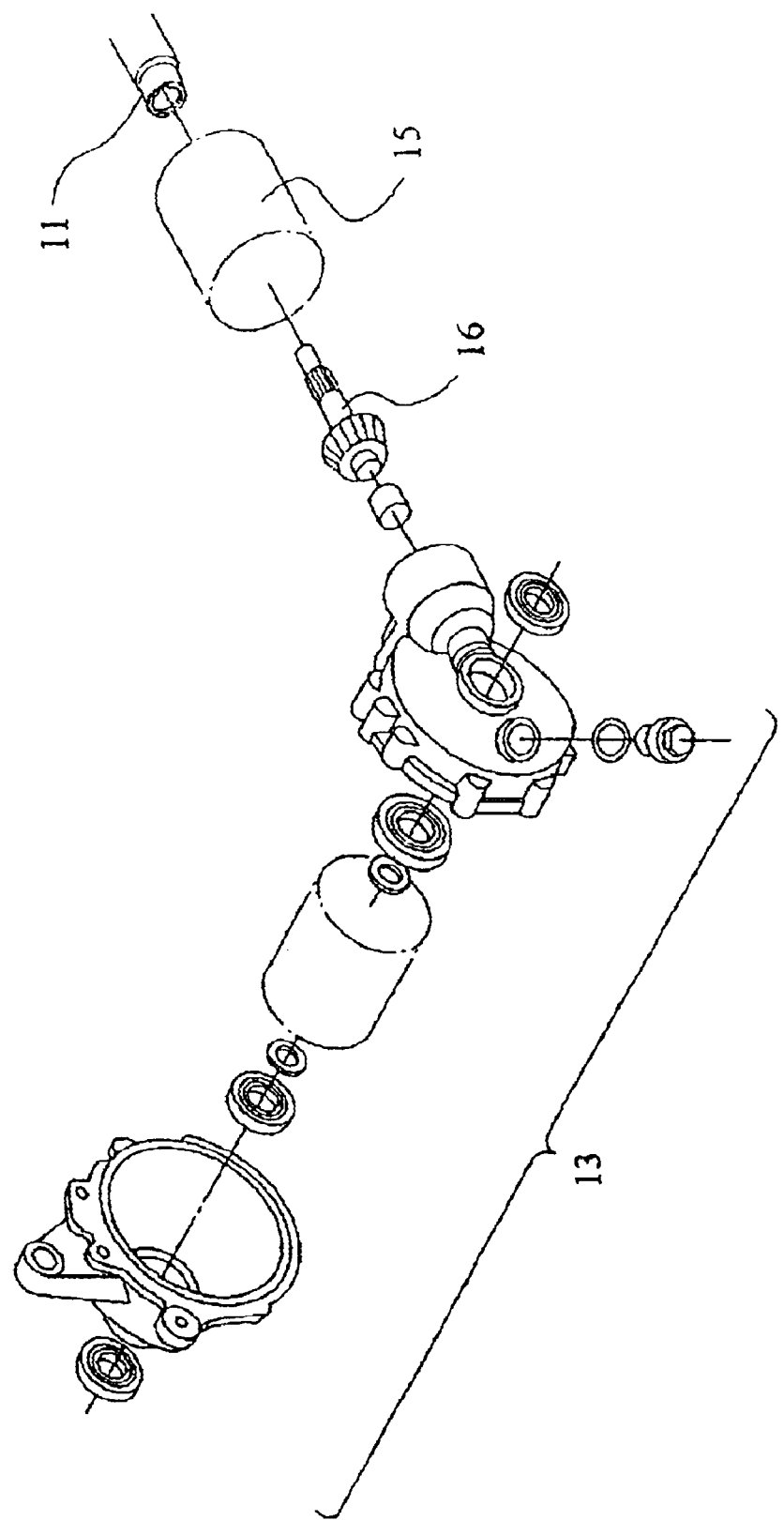
FIG. 2 is an exploded perspective view showing the main part in one embodiment of the invention.

A two-wheel-drive/four-wheel-drive switching system 15 equivalent to this embodiment is provided to the side of a final reduction gear unit 13 for front wheels 4 and a final reduction gear unit 14 for rear wheel 5 are arranged before and after an engine 2 as shown in FIGS. 1 and 2. A propeller shaft 11 is provided that extends ahead of the engine 2 to the final reduction gear unit 13 for the front wheels 4 and is integrated with the final reduction gear unit 13 for the front wheel 4.

As illustrated in FIG. 1, a pair of right and left drive shafts 43 are coupled to the final reduction gear unit 13 for the front wheels 4. A pair of right and left axle housings 44 are coupled to the final reduction gear unit 14 for the rear wheel 5 and into which a drive shaft for a rear wheel is inserted. Wheel hubs 45 and 46 are provide for the front wheels 4 and a rear wheels 5. The wheel hubs 45 and 46 are attached to the ends of each drive shaft 43 and each axle housing 44.

Figure 3:
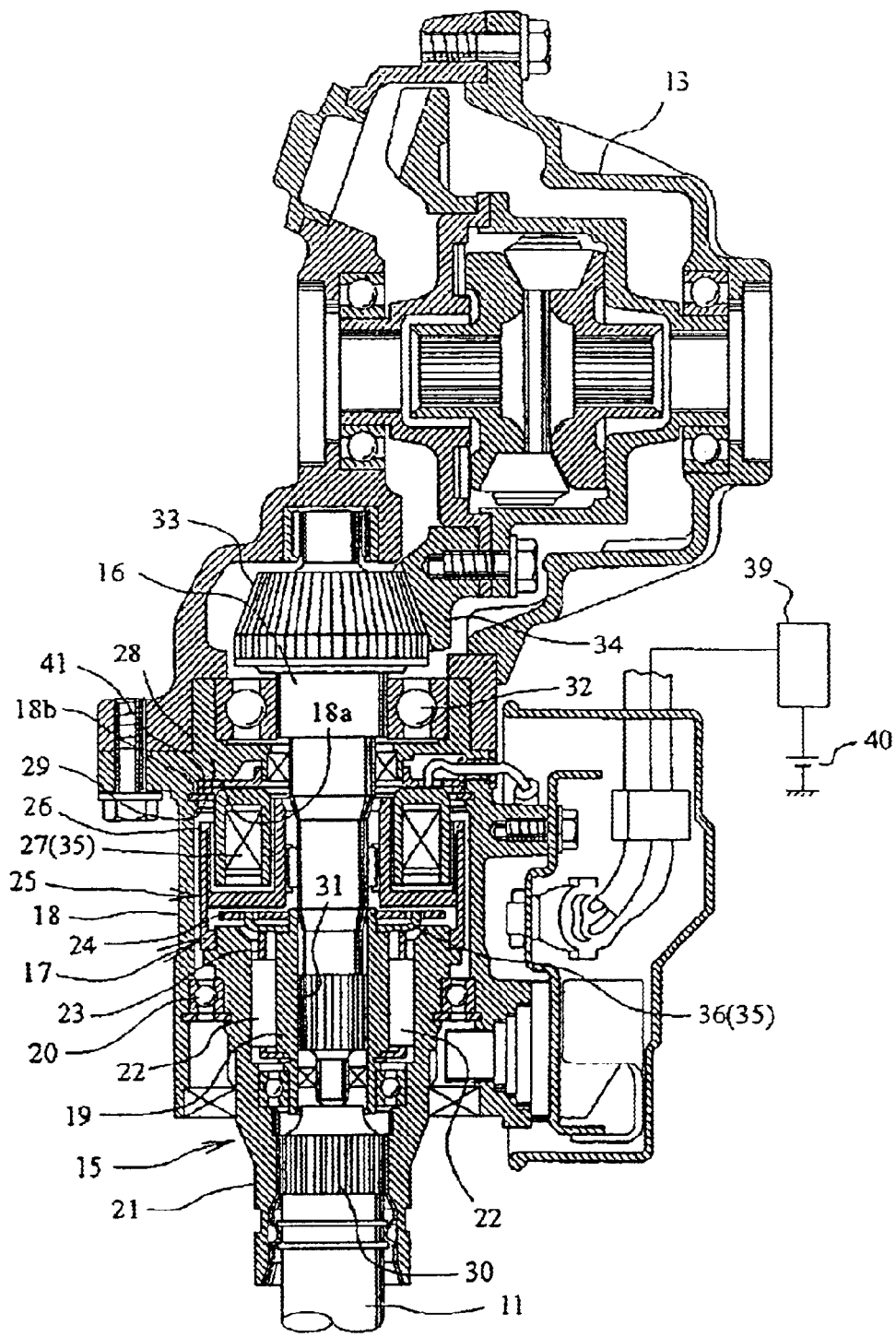
FIG. 3 is an enlarged sectional view showing one embodiment of the invention.

The two-wheel-drive/four-wheel-drive switching system 15 (hereinafter abbreviated as a drive switching system) is provided to a power transmission mechanism on the side of the front wheel 4 and is composed of a switching unit 17 for enabling or disabling the transmission of power in the power transmission mechanism as shown in FIG. 3. The switching unit 17 is mainly composed of the propeller shaft 11 coupled to the drive side, a pinion shaft 16 fitted to the propeller shaft 11 via a circular clearance, plural connecting/disconnecting members (rollers) 22 for connecting or disconnecting the propeller shaft 11 and the pinion shaft 16 by inserting them in the clearance between the propeller shaft 11 and the pinion shaft 16 and fitting or drawing them to/apart from the opposite faces. A switching mechanism 25 is provided for selectively locating the connecting/disconnecting members 22 in a position where the propeller shaft 11 and the pinion shaft 16 are connected or are in a position where they are disconnected and a casing 18 is provided for surrounding the elements.

Next, to explain the details, in this embodiment, a cylindrical outer ring 21 protrudes on the side of an engine and is provided via a bearing 20 in the casing 18 so that the outer ring can revolve.

A spline 30 is formed on the inside face at the end on the side of the engine of the outer ring 21, and the propeller shaft 11 and the outer ring 21 are coupled by engaging the outer ring 21 with the spline 30 and inserting the propeller shaft 11.

An inner ring 19 having a regular polygonal cross section is arranged via a circular interval having predetermined width between the inner ring and the inside face of the outer ring 21 inside the outer ring 21.

A spline 31 is formed on the inside face of the inner ring 19 and the pinion shaft 16 inserted into the casing 18 is coupled to the inner ring 19 via the spline 31.

An intermediate part in the longitudinal direction of the pinion shaft 16 is supported by a bearing 32 attached to the casing 18 so that the pinion shaft can revolve.

A pinion gear 33 is integrated with the end of the pinion shaft 16 and is engaged with a ring gear 34 of the final reduction gear unit for the front wheel 13.

Figure 6A:
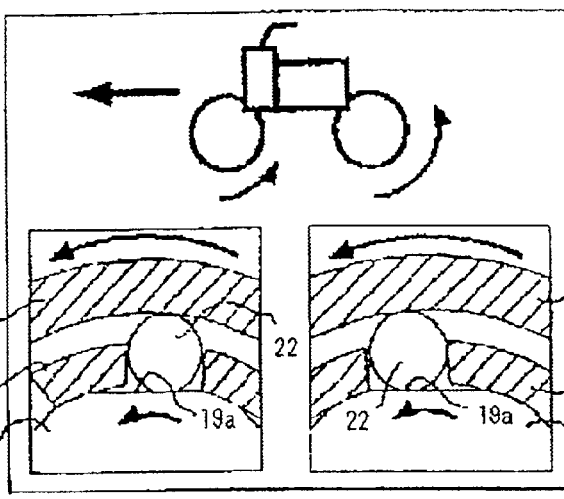
FIGS. 6(a)–6(f) are sectional views for explaining the operation of connecting/disconnecting members in one embodiment of the invention.
Figure 6B:
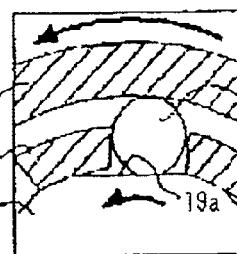
Figure 6C:
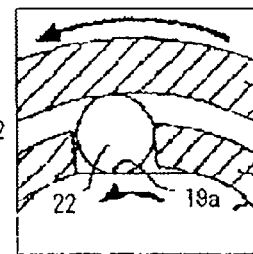

The connecting/disconnecting members 22 forming the switching unit 17 are formed by plural rollers arranged in parallel with the axis of the outer ring 21 as shown in FIGS. 3, 6A and 6B, the switching mechanism 25 holds the connecting/disconnecting members 22 so that they can revolve and includes a retainer 23 attached to the outer ring 21 so that the retainer can relatively freely revolve (can be relatively moved axially). A cam face 19a is formed on the surface of the inner ring 19 for moving the connecting/disconnecting members 22 in the radial direction according to its relative movement with the retainer 23.

The connecting/disconnecting members 22 of an odd number generally, nine pieces in this embodiment are provided and cam faces 19a formed on the inner ring 19 of nine pieces are similarly provided.

A first elastic member 42 are provided for pressing the connecting/disconnecting members 22 in a direction in which the outer ring 21 and the inner ring 19 are connected by pressing the retainer 23 in a direction reverse to the rotational direction of the propeller shaft 11 when the vehicle 1 travels forward. The first elastic member 42 is provided between the retainer 23 and the inner ring 19.

The first elastic member 42 is formed substantially in a C frame and the respective ends are fitted to the retainer 23 and the inner ring 19 from the rotational direction and the elastic member is installed in a state in which the diameter is contracted.

An electromagnetic clutch 35 forming the switching mechanism 25 for fixing or separating the retainer 23 and the outer ring 21 is provided to the end located inside the casing 18 of the outer ring 21.

The electromagnetic clutch 35 is composed of a clutch plate 36 inserted between the retainer 23 and the outer ring 21 and an electromagnetic coil 27 for pressing or separating the clutch plate 36.

The electromagnetic coil 27 connects the retainer and the outer ring by energizing the clutch plate 36 and hereby, fixes the retainer 23 and the outer ring 21 so that they cannot be turned relative to each other.

The electromagnetic coil 27 is formed in a circle, is housed in a core similarly formed in a circle and is attached to the casing 18 so that the electromagnetic coil surrounds the pinion shaft 16.

The outer ring 21, the inner ring 19 and the switching mechanism 25 are built and united in the casing 18 and are attached to the final reduction gear unit for the front wheel 13 by fastening the casing 18 onto a case of the final reduction gear unit for the front wheel 13 by a bolt in a state in which the pinion shaft 16 is installed as shown in FIG. 3.

A control unit 39 for controlling turning on/off the electromagnetic coil and a power source 40 for supplying power for driving the electromagnetic coil 27 are connected to the electromagnetic coil 27.

Next, structure for attaching the switching mechanism 25 to the casing 18 will be described.

Figure 4A:
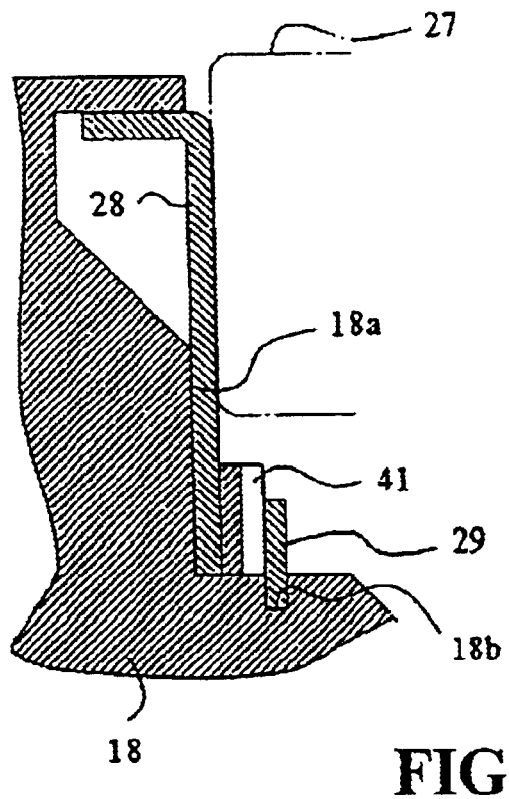
FIGS. 4(a)–4(c) are longitudinal sectional views showing the main part in one embodiment of the invention.
Figure 4B:
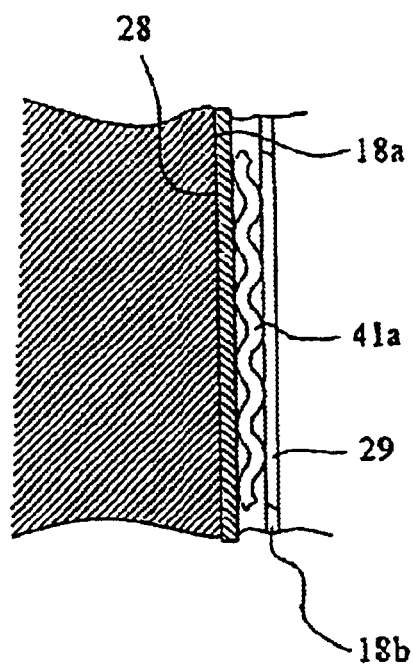
Figure 4C:
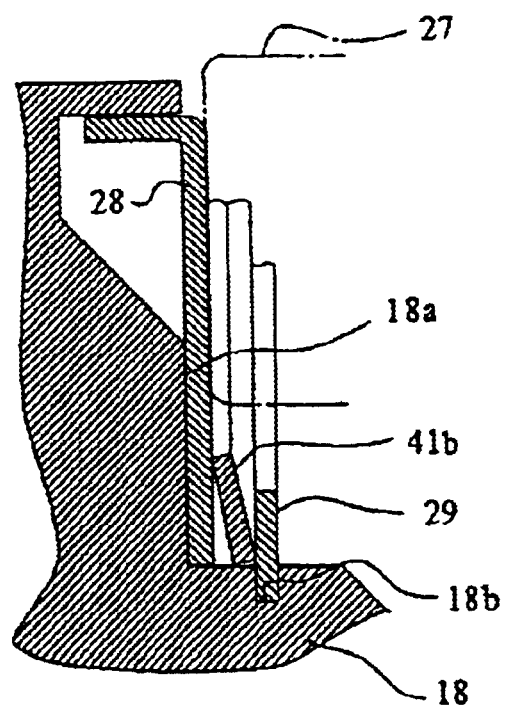

As shown in FIGS. 4(a)–4(c), an outside flange 28 is integrated all around an end of the core of the electromagnetic coil 27. A fitting section having a difference in a level 18a provided with substantially a similar inside diameter to the outside diameter of the outside flange 28 is formed in the vicinity of the end on the side of the final reduction gear unit 13 for the front wheels 4 inside the casing 18 and a fitting groove 18b is formed all around the inside face and spaced apart from the fitting section 18a by a predetermined distance.

A circlip 29 is inserted into the fitting groove 18b and is opposed to the outside flange 28 from the side reverse to the fitting section 18a with an elastic member 41 being inserted between the circlip 29 and the outside flange 28 in a state in which the elastic member 41 is compressed. The outside flange 28, that is, the switching mechanism 25 is fixed to the casing 18 by pressing the outside flange 28 on the fitting section 18a by the elasticity of the second elastic member 41.

Further, a wave washer is used for the second elastic member 41 as shown in FIGS. 4(a) and 4(b) and is inserted between the circlip 29 and the outside flange 28 in a state in which the wave washer is compressed so that the pitch of waves becomes large.

The second elastic member 41 may be also formed by a coned disc spring 41b as shown in FIG. 4(c) in place of the wave washer 41a.

In the drive switching system 15 equivalent to this embodiment and configured as described above, in the case where the switching mechanism 25 is fixed to the casing 18, the switching mechanism 25 is inserted into the casing 18 from the side of the outside flange 28 and the outside flange 28 touches to the fitting section 18a of the casing 18. Thereafter, the second elastic member 41 is inserted into the casing 18 and touches to the outside flange 28. Further, the circlip 29 is inserted into the casing 18 in a state in which the diameter of the circlip is contracted, the elastic member 41 is further inserted, compressing it with the diameter of the circlip 29 being extended into the fitting groove 18b and the circlip is fitted into the fitting groove 18b.

The outside flange 28 is pressed on the fitting section 18a of the casing 18 by the elasticity of the second elastic member 41 compressed by the cisclip 29 as a support fitted into the fitting groove 18b by such an operation.

Thereby, the outside flange 28 is pressed on the fitting section 18a without a clearance and the switching mechanism 25 is fixed to the casing 18 without a clearance.

As a result, the misregistration due to vibration in operation of the switching mechanism 25 can be prevented and noise caused by rattling can be prevented.

An interval between the rotor 26 and the armature 24 can be held fixed and thereby, the characteristics of the electromagnetic clutch 35 can be prevented from varying.

To release the transmission of driving force to the front wheels 4, the electromagnetic coil 27 is deenergized and fixation by the electromagnetic clutch 35 between the retainer 23 and the outer ring 21 is released.

In this state, as shown in FIG. 6(b), each connecting/disconnecting member 22 is pressed on one top of the cam face 19a of the inner ring 19 by the elastic member 41 and is elastically touched to the outer ring 21 and the inner ring 19. However, as the turning force of the outer ring 21 is large as shown in FIGS. 6(a) and 6(b), the connecting/disconnecting member 22 is moved by the outer ring 21 in a direction in which the connection to the inner ring 19 is released against the pressure of the elastic member 42.

As a result, the outer ring 21 and the inner ring 19 are separated, the revolution of the propeller shaft 11 is prevented from being transmitted to the pinion shaft 16 and the transmission of driving force to the front wheel 13 is stopped.

Figure 6D:
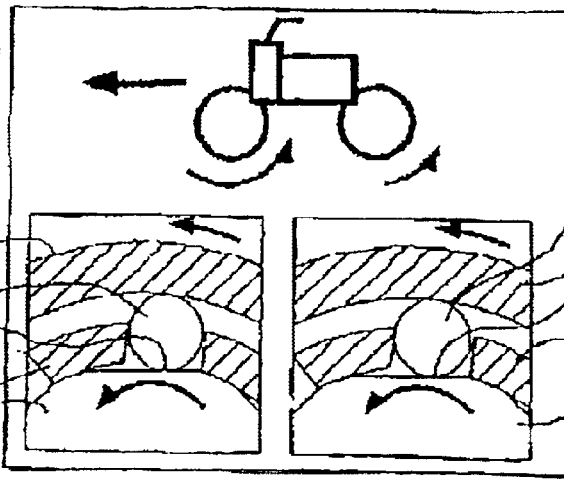
Figure 6E:
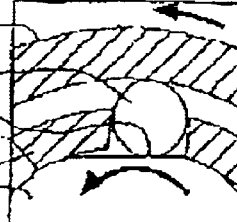

In the meantime, as the turning force of the outer ring 21 is deteriorated as shown by arrows in FIGS. 6(d) and 6(e) when operation for braking the rear wheel 5 for example is made in such a two wheel drive system, the connecting/disconnecting member 22 pressed by the elastic member 42 is moved toward one top of the cam face 19a of the inner ring 19.

Therefore, the front wheel 4 and the rear wheel 5 are connected and brakes are applied to the front and rear wheels 4 and 5.

This is also similar when an engine brake is applied.

To turn into a state of four wheel drive, the retainer 23 is fixed to the outer ring 21 by energizing the electromagnetic coil 27 and connecting the electromagnetic clutch 35.

Figure 5C:
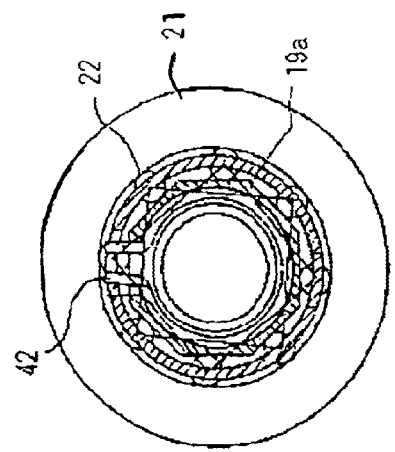
FIGS. 5(a)–5(d) show one embodiment of the invention and are enlarged sectional views showing the main part for explaining the operation of a drive switching system.
Figure 5A:
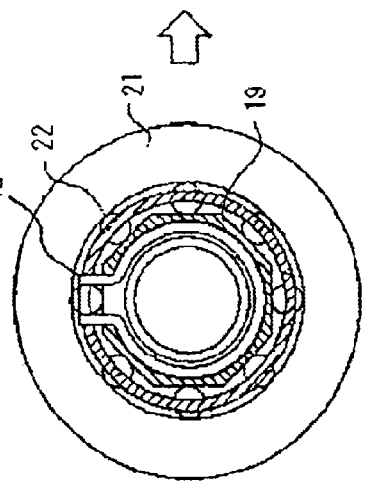
Figure 5D:
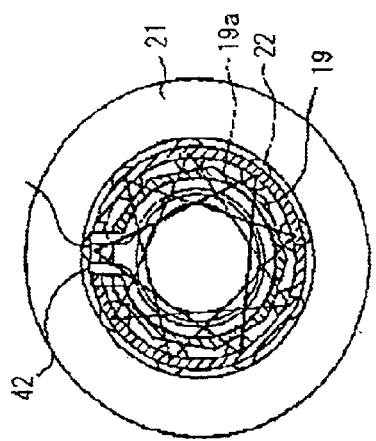

Thereby, the connecting/disconnecting member 22 held by the retainer 23 is moved together with the outer ring 21, is moved to the other top of the cam face 19a formed on the inner ring 19 as shown in FIG. 5(d) and touches the inside face of the outer ring 21.

As a result, the outer ring 21 and the inner ring 19 are coupled via the connecting/disconnecting member 22, thereby, the propeller shaft 11 and the pinion shaft 16 are coupled, the revolution of the propeller shaft 11 is transmitted to the pinion shaft 16 and the transmission of a driving force to the front wheel 13 is started.

Figure 6F:
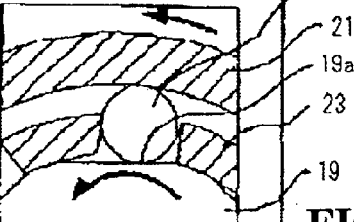

When the rear wheel 5 is braked in four wheel drive, one top of a cam formed on the inner ring 19 touches the connecting/disconnecting member 22 as shown in FIG. 6(f) because the inner ring 19 revolves in advance.

Thereby, a four-wheel-drive state is held and brakes are applied to the front and rear wheels 4 and 5 as described above.

Figure 5B:
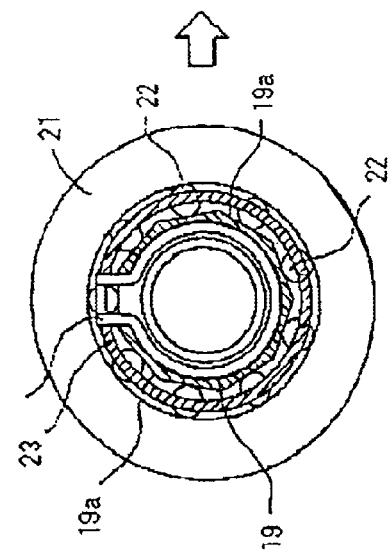

In the meantime, as the connecting/disconnecting members 22 of the odd number, nine pieces in this embodiment are provided when the inner ring 19 and the outer ring 21 are connected via the connecting/disconnecting member 22 as described above, three connecting/disconnecting members 22 hit at an initial stage of connection as shown in FIG. 5(b) and afterward, the other connecting/disconnecting members 22 sequentially hit.

Therefore, the inner ring 19 and the outer ring 21 touch at three points and afterward, they are centered.

Thereby, the balance of the connection is improved, noise is prevented from being made, contact pressure between the connecting/disconnecting member 22 and the inner ring 19 or the outer ring 21 is reduced and the system can be miniaturized.

In case the connecting/disconnecting members 22 of an even number are provided as shown in FIGS. 5(c) and 5(d) differently from the embodiment described above, the connecting/disconnecting members 22 are sequentially touched after the inner ring 19 and the outer ring 21 are touched in two locations at the initial stage of the connection as shown in FIG. 5(d), the inner ring 19 and the outer ring 21 are not immediately centered and supposedly noise is made.

The shape and the dimensions of each component described in the embodiment are one example and can be varied according to requirements of design.

As described above, according to the present invention, the outside flange provided to the electromagnetic coil is pressed on the fitting section of the casing in which the electromagnetic coil is built by the elasticity of the elastic member compressed by the circlip as a support fitted into the fitting groove. Thereby, the outside flange is pressed on the fitting section without a clearance and the electromagnetic coil, that is, the switching mechanism formed by the electromagnetic coil can be fixed onto the casing without a clearance.

As a result, the misregistration of the switching mechanism due to vibration during operation can be prevented, noise can be prevented from being made due to rattling and the characteristics of the switching mechanism can be prevented from varying.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheel-drive/four-wheel-drive switching system for a vehicle, comprising:

a switching unit provided to either a power transmission mechanism provided between an engine and a front wheel and a power transmission mechanism provided between the engine and a rear wheel for enabling or disabling the transmission of power;

said power transmission mechanism being provided with a driving shaft coupled to the drive side, a driven shaft fitted to the driving shaft via a circular clearance, plural connecting/disconnecting members inserted in the clearance between the driving shaft and the driven shaft for connecting or disconnecting the driving shaft and the driven shaft by fitting or separating the connecting/disconnecting members to/from the opposite faces of the shafts, a switching mechanism for selectively locating the connecting/disconnecting members in a position wherein the driving shaft and the driven shaft are connected or in a position where they are disconnected and a casing for housing the switching unit;

an outside flange is provided to an electromagnetic coil forming the switching mechanism;

a fitting section having a difference in a level to which the outside flange touches is formed in the casing;

a fitting groove is formed on an inside face at an interval equal to or larger than the thickness of the outside flange and spaced from the fitting section;

a circlip opposite to the outside flange is inserted into the fitting groove; and the outside flange is pressed on the fitting section by inserting a circular elastic member between the circlip and the outside flange.

2. The two-wheel-drive/four-wheel-drive switching system for a vehicle according to claim 1, wherein the elastic member is formed by a wave washer.

3. The two-wheel-drive/four-wheel-drive switching system for a vehicle according to claim 1, wherein the elastic member is formed by a coned disc spring.

4. The two-wheel-drive/four-wheel-drive switching system for a vehicle according to claim 1, wherein said casing includes a recessed area for accommodating an outwardly projecting portion of said outside flange.

5. The two-wheel-drive/four-wheel-drive switching system for a vehicle according to claim 4, wherein said outside flange includes an elongated section having an outside diameter and the projecting portion projecting into said recessed area, said elongated section extending within said fitting section and engaging an inside diameter thereof.

6. The two-wheel-drive/four-wheel-drive switching system for a vehicle according to claim 1, wherein fitting section is spaced a predetermined distance relative to said fitting groove for accommodating said elastic member therebetween.

7. The two-wheel-drive/four-wheel-drive switching system for a vehicle according to claim 1, wherein misregistration due to vibration of the switching mechanism is prevented by the arrangement of the outside flange, circlip and elastic member.

8. A two-wheel-drive/four-wheel-drive switching system for a vehicle, comprising:

a switching mechanism for selectively locating connecting/disconnecting members in a position wherein a driving shaft and a driven shaft are connected or in a position where the driving shaft and the driven shaft are disconnected;

a casing for housing the switching mechanism;

an outside flange is provided to an electromagnetic coil forming the switching mechanism;

a fitting section formed in the casing for accommodating the outside flange;

a fitting groove formed on an inside face at an interval equal to or larger than the thickness of the outside flange and being spaced from the fitting section;

a circlip opposite to the outside flange and positioned in the fitting groove; and the outside flange is pressed on the fitting section by inserting an elastic member between the circlip and the outside flange.

9. The two-wheel-drive/four-wheel-drive switching system for a vehicle according to claim 8, wherein the elastic member is formed by a wave washer.

10. The two-wheel-drive/four-wheel-drive switching system for a vehicle according to claim 8, wherein the elastic member is formed by a coned disc spring.

11. The two-wheel-drive/four-wheel-drive switching system for a vehicle according to claim 8, wherein said casing includes a recessed area for accommodating an outwardly projecting portion of said outside flange.

12. The two-wheel-drive/four-wheel-drive switching system for a vehicle according to claim 11, wherein said outside flange includes an elongated section having an outside diameter and the projecting portion projecting into said recessed area, said elongated section extending within said fitting section and engaging an inside diameter thereof.

13. The two-wheel-drive/four-wheel-drive switching system for a vehicle according to claim 8, wherein fitting section is spaced a predetermined distance relative to said fitting groove for accommodating said elastic member therebetween.

14. The two-wheel-drive/four-wheel-drive switching system for a vehicle according to claim 8, wherein misregistration due to vibration of the switching mechanism is prevented by the arrangement of the outside flange, circlip and elastic member.

* * * * *